(12) United States Patent
Chamberlain et al.

(10) Patent No.: US 9,792,527 B2
(45) Date of Patent: Oct. 17, 2017

(54) AUTOMATED SLIDE COMPARATOR

(71) Applicant: INTERNATIONAL BUSINESS MACHINES CORPORATION, Armonk, NY (US)

(72) Inventors: James L. Chamberlain, Durham, NC (US); James H. Clinton, San Francisco, CA (US); Blain A. Dillard, Cary, NC (US); David A. Hoffman, Raleigh, NC (US); Terrence E. White, Cottage Grove, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/882,630

(22) Filed: Oct. 14, 2015

(65) Prior Publication Data
US 2017/0109608 A1    Apr. 20, 2017

(51) Int. Cl.
*G06K 9/68* (2006.01)
*G06K 9/62* (2006.01)
*G06F 17/22* (2006.01)

(52) U.S. Cl.
CPC ........ *G06K 9/6215* (2013.01); *G06F 17/2211* (2013.01); *G06K 9/6212* (2013.01)

(58) Field of Classification Search
CPC ....... G06T 11/206; G06T 11/20; G06T 19/20; G06T 9/00
(Continued)

(56) References Cited

U.S. PATENT DOCUMENTS 5,596,691 A * 1/1997 Good ............... G06T 11/206
345/440
7,146,380 B2 * 12/2006 Schaepe ............ G06K 9/00127
(Continued)

FOREIGN PATENT DOCUMENTS

EP    1973046 A1    9/2008

OTHER PUBLICATIONS

About.com, Use PowerPoint Slide Finder to Copy Frequently Used Slides, http://presentationsoft.about.com/od/nextstepsinpowerpoint, 2015.
(Continued)

*Primary Examiner* — Yosef Kassa
(74) *Attorney, Agent, or Firm* — Patrick J. Daugherty; Driggs, Hogg, Daugherty & Del Zoppo Co., LPA

(57) ABSTRACT

In response to an identification of an input slide, aspects generate text content confidence scores that represent amounts of similarity of slide text content of the input slide to compared text content of a slides that are included within slide presentation files of a repository. Graphic element content confidence scores are generated that represent amounts of similarity of graphic content of the input slide to compared graphic element content of the respective ones of the repository slides. Similarity confidence scores are generated for respective ones of the repository slides as functions of weighted averages of the generated text content confidence scores and graphic element content confidence scores, wherein the graphic element content confidence scores are weighted differently from the text content confidence scores. The repository slides may be ranked for similarity to the input slide as a function of the generated similarity confidence scores.

20 Claims, 6 Drawing Sheets

(58) Field of Classification Search
USPC ............... 382/170, 187, 209, 220, 224, 278; 358/1.15, 537, 538
See application file for complete search history.

(56) References Cited

U.S. PATENT DOCUMENTS

| | | | | |
|---|---|---|---|---|
| 7,302,475 | B2* | 11/2007 | Gold | G06Q 30/02 709/203 |
| 7,685,224 | B2* | 3/2010 | Nye | H04L 63/104 709/201 |
| 7,857,224 | B2* | 12/2010 | Lei | G06K 7/10722 235/462.42 |
| 7,874,478 | B2* | 1/2011 | Molbak | G07D 1/04 235/375 |
| 7,912,898 | B2* | 3/2011 | Gold | G06Q 30/02 709/203 |
| 8,115,584 | B2* | 2/2012 | Eriksson | H01F 3/14 336/178 |
| 8,140,318 | B2* | 3/2012 | Holland | G06F 8/38 345/650 |
| 8,150,736 | B2* | 4/2012 | Horn | G06Q 10/087 705/26.1 |
| 8,543,573 | B2* | 9/2013 | MacPherson | G06N 5/02 707/736 |
| 8,554,021 | B2 | 10/2013 | Kletter | |
| 2015/0095314 | A1 | 4/2015 | Okamoto et al. | |

OTHER PUBLICATIONS

Powersearch Add-In, Find your PowerPoint slides quickly, http://www.accent-technologies.com/products/power-search-add-in#, 2015.
S2 Solutions, LLC, The PowerPoint Organizer, http://www.simplyzoom.com, 2010-2014.
Zinali, LLC, Find slides and build presentations fast!, Slideboxx PowerPoint Search Engine, http://slideboxx.com, 2013.
Slidefinder, Long formal gowns make you shinier, http://www.slidefinder.net/l/longformaldressesmakeyoushinier, 2012.
Linkedin Corporation, Upload, Share, and Discover Content on SlideShare, http://www.slideshare.net, 2015.
Peter Mell et al, The NIST Definition of Cloud Computing, National Institute of Standards and Technoogy, 2011.

* cited by examiner

Raw Scores from the Comparison Algorithms for a Given Slide

| Slide ID | Title | Body | SpeakerNotes | Image |
|---|---|---|---|---|
| Slide2 | 8 | 91 | 98 | .15 |
| Slide3 | 88 | 95 | 98 | .14 |
| Slide4 | 10 | 0 | .75 | 99 |
| Slide5 | 0 | 59 | 90 | 99 |
| Slide6 | 88 | 98 | 99 | 99 |

FIG. 5

Normalized Scores from the Comparison Algorithms for a Given Slide

| Slide ID | Title | Body | SpeakerNotes | Image |
|---|---|---|---|---|
| slide2 | 91 | 8 | 2 | 99 |
| slide3 | 1 | 4 | 2 | 99 |
| slide4 | 89 | 100 | 99 | 1 |
| slide5 | 100 | 41 | 10 | 1 |
| slide6 | 1 | 1 | 1 | 1 |

FIG. 6

Sample Catalog Table for a Given Slide

| Slide ID | % Confidence Primary | % Confidence Secondary | % Confidence Final |
|---|---|---|---|
| slide2 | 51.3 | 80.1 | 80.1 |
| slide3 | 31.7 | 75 | 75 |
| slide4 | 68 | N/A | 68 |
| slide5 | 37.7 | N/A | 37.7 |
| slide6 | 1 | N/A | 1 |

FIG. 7

AUTOMATED SLIDE COMPARATOR

BACKGROUND

Aspects of the present invention address personal productivity issues that arise in building PowerPoint® presentation files (which are typically identified with a ".ppt" extension), OpenOffice™ and/or other slide presentation files on related topics for multiple audiences. (POWERPOINT is a trademark of the Microsoft Corporation in the United States or other countries; OPENOFFICE is a trademark of The Apache Software Foundation in the United States or other countries.) Slide presentation files are built from a number of individual, single pages ("slides") that are each presented, one at a time, in a sequence via a presentation slide deck that in combination convey a totality of the slide show presentation. Over time, it is common for users to build and manually manage multiple versions of related slides that each have different content that may be appropriate for inclusion in a presentation slide deck. The manual management and selection of slides for inclusion in a current project based on similar versions of a slide, or based on differences in slide content, can be cumbersome and detrimental to the personal productivity of the presenter.

SUMMARY

In one aspect of the present invention, a method for automated slide content comparison includes a processor, in response to an identification of an input slide, generating text content confidence scores that represent amounts of similarity of slide text content of the input slide to compared text content of a slides that are included within slide presentation files of a repository. Graphic element content confidence scores are generated that represent amounts of similarity of graphic content of the input slide to compared graphic element content of the respective ones of the repository slides. Similarity confidence scores are generated for respective ones of the repository slides as functions of weighted averages of the generated text content confidence scores and graphic element content confidence scores, wherein the graphic element content confidence scores are weighted differently from the text content confidence scores. Thus, the repository slides are ranked for similarity to the input slide as a function of the generated similarity confidence scores.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to an identification of an input slide, generates text content confidence scores that represent amounts of similarity of slide text content of the input slide to compared text content of a slides that are included within slide presentation files of a repository. Graphic element content confidence scores are generated that represent amounts of similarity of graphic content of the input slide to compared graphic element content of the respective ones of the repository slides. Similarity confidence scores are generated for respective ones of the repository slides as functions of weighted averages of the generated text content confidence scores and graphic element content confidence scores, wherein the graphic element content confidence scores are weighted differently from the text content confidence scores. Thus, the repository slides are ranked for similarity to the input slide as a function of the generated similarity confidence scores.

In another aspect, a computer program product for automated slide content comparison has a computer-readable storage medium with computer readable program code embodied therewith. The computer-readable storage medium is not transitory media per se. The computer readable program code includes instructions for execution which cause the processor to, in response to an identification of an input slide, generate text content confidence scores that represent amounts of similarity of slide text content of the input slide to compared text content of a slides that are included within slide presentation files of a repository. Graphic element content confidence scores are generated that represent amounts of similarity of graphic content of the input slide to compared graphic element content of the respective ones of the repository slides. Similarity confidence scores are generated for respective ones of the repository slides as functions of weighted averages of the generated text content confidence scores and graphic element content confidence scores, wherein the graphic element content confidence scores are weighted differently from the text content confidence scores. Thus, the repository slides are ranked for similarity to the input slide as a function of the generated similarity confidence scores.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 5 is a tabular illustration of an example of raw score generation according to the present invention.

FIG. 6 is a tabular illustration of an example of normalized score generation according to the present invention.

FIG. 7 is a tabular illustration of an example of confidence score generation according to the present invention.

DETAILED DESCRIPTION

Figure 1:
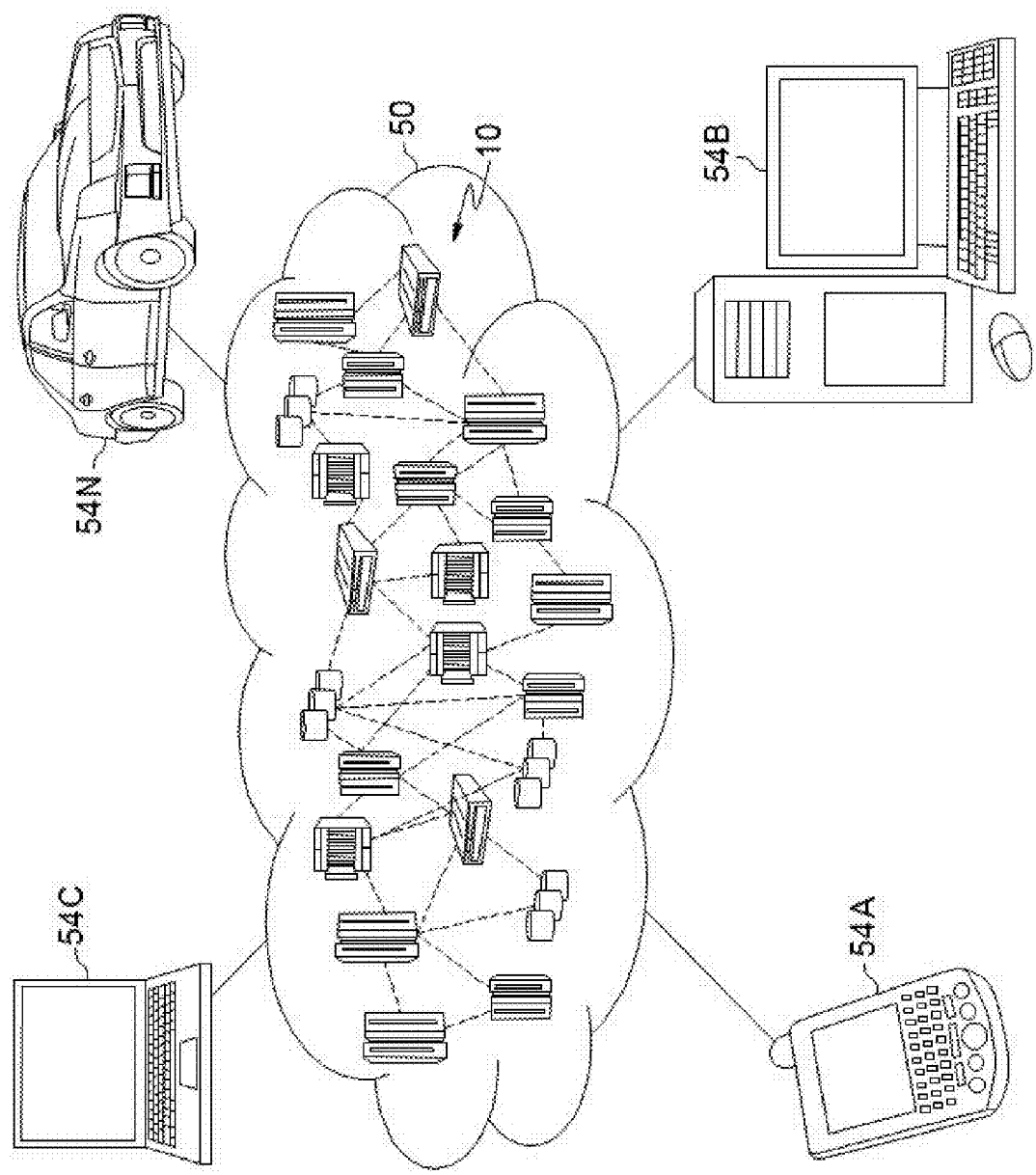
FIG. 1 depicts a cloud computing node according to an embodiment of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
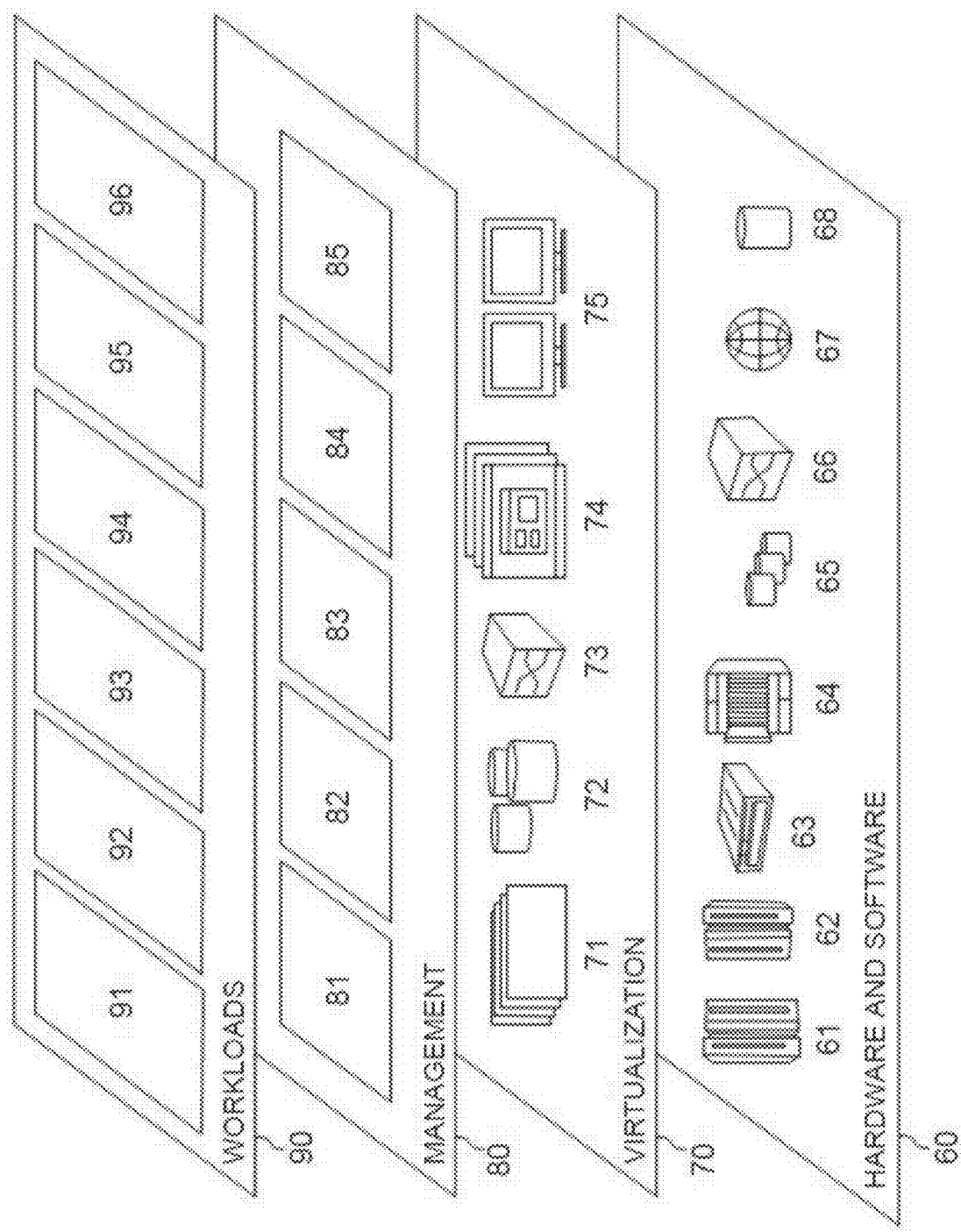
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for automated slide content comparison as described below.

Figure 3:
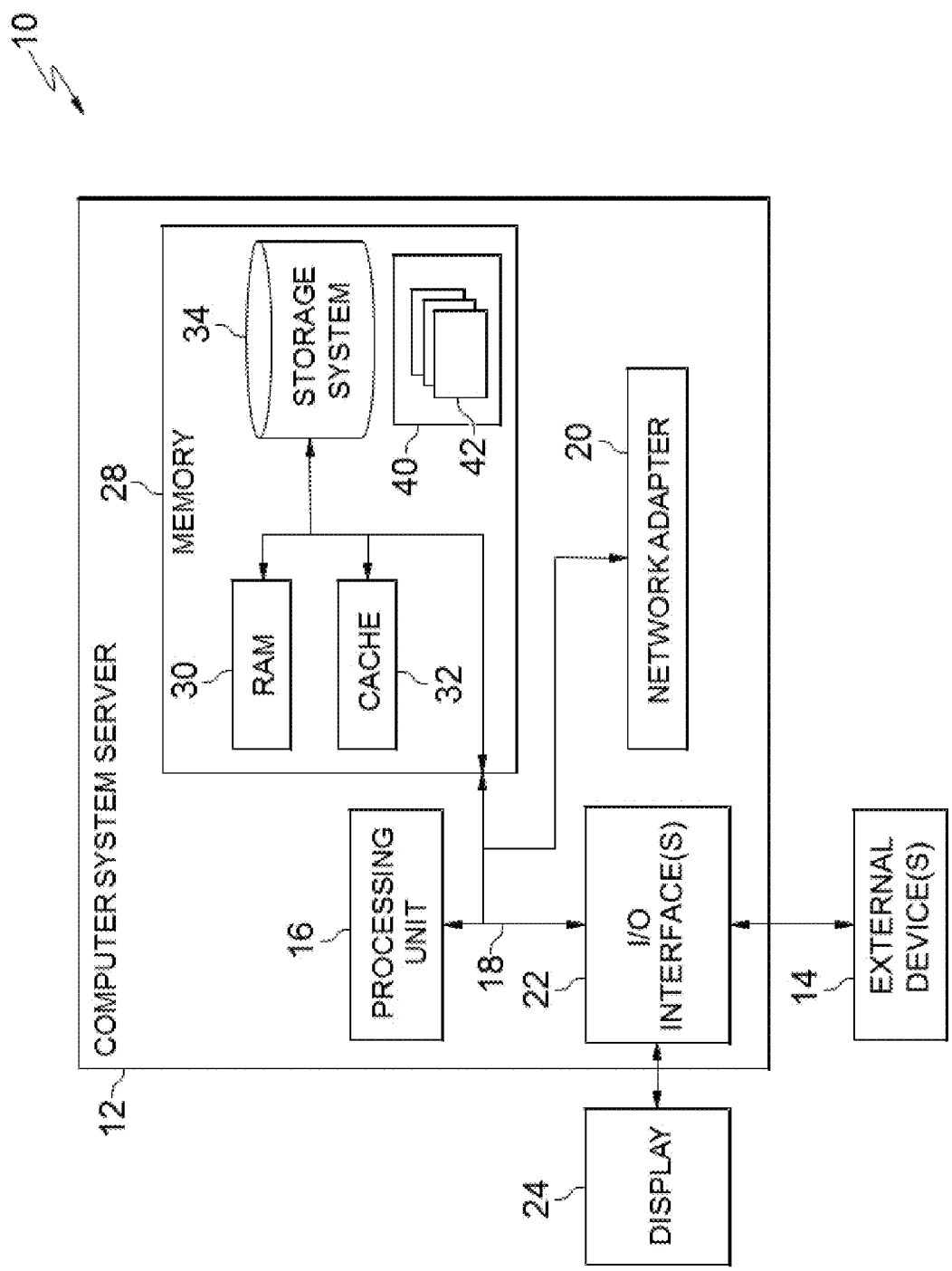
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment 50 of FIG. 1. Programmable device implementation 10 (FIG. 3) is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Pre-existing slide image content available for incorporation into slide show presentation files may be categorized with respect to two attributes: (i) text content—the words, numbers and other symbols which appear on a slide such as in titles, text boxes, or objects, etc., and have self-evident, semantic meaning; and (ii) visual content—the collection or arrangement of graphic elements in images on the slide which may convey direct or indirect semantic content (trademark symbols and images, trade dress, graphic representations of architectural and known locations and entities, pictures, graphs, charts, shapes, lines, clip art, etc.) via their scale, appearance, arrangement, coloring, etc.

Prior art tools such as Simplyzoom™ enable users to assign labels to individual slides in order to define a searchable, organizing label structure, to thereby catalog file folders of slide show presentation files into a large library of files, providing functionality to pick and choose slides from different files when making a new presentation as a function of the assigned labels (SIMPLYZOOM is a trademark of S2 Solutions, LLC., in the United States or other countries; see "http://www.simplyzoom.com/".)

Other prior art tools, such as Slideboxx™, build searchable indexes of slides from text content determined from the slides, thereby enabling searching and filtering of slides based on the determined text content. (SLIDEBOXX is a trademark of Zinali, LLC, in the United States or other countries; see http://www.slideboxx.com/.)

Aspects of the present invention provide enhanced slide content comparison and selection that goes beyond text content and labeling considerations and enable functionality for image based comparisons. Aspects provide an intelligent slide comparison algorithm process or system that retrieve slides that have similar or otherwise desired graphic element layouts but different (dissimilar) text, wherein the prior art may not find a match based on the text content or labeling differences within the matching/selected slides. Versions of slides sharing graphic elements of interest may be matched not only based on text content comparisons, but as a function of visual element rendering as well.

Figure 4:
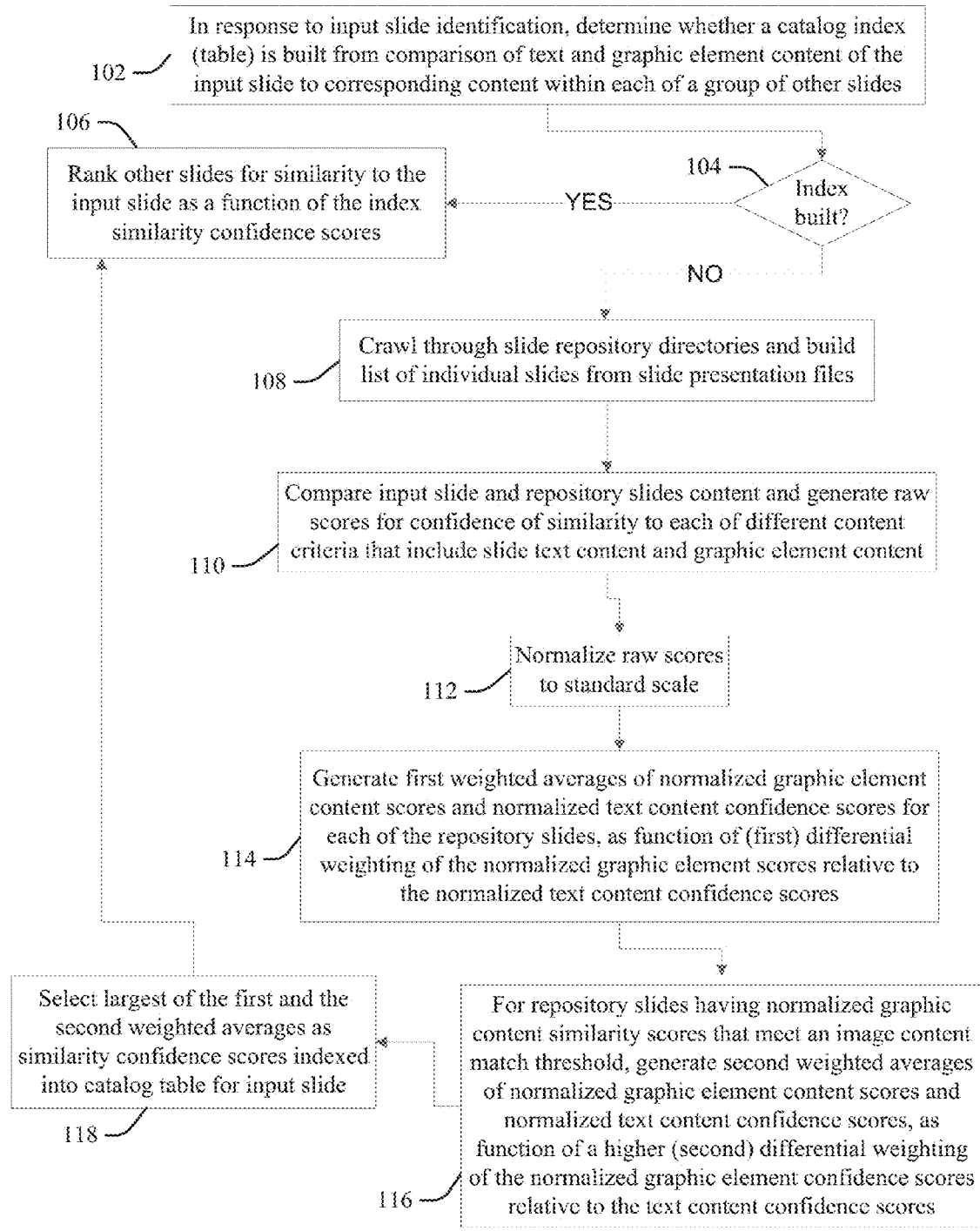
FIG. 4 is a flow chart illustration of a method or process according to an embodiment of the present invention for automated slide content comparison.

FIG. 4 (or "FIG. 4") illustrates a computer implemented method or process of an aspect of the present invention for automated slide content comparison. A processor (for example, a central processing unit (CPU)) executes code, such as code installed on a storage device in communication with the processor, and thereby performs the following process step elements illustrated in FIG. 4.

At 102 in response to an identification of an input slide as a basis for finding other similar slides for use in a slide presentation slide deck, the process/system determines whether a catalog index or table of similarity confidence values has been determined (built) from a comparison of text and graphic element content of the input slide to corresponding content within each of a group of other slides that are accessible to the processor. Generally the identification of the input slide is via a Graphic User Interface (GUI) input from a user, though other input identifications may be practiced.

If determined at 104 that a catalog index or table of similarity confidence values are built for the input slide relative to the other slides, then at 106 the other slides are ranked for similarity to the input slide as a function of the index similarity confidence scores. Generally the catalogs contain rows of confidence values of similarity for each of the other slides, and each time a slide compare function is invoked via input of a slide at 102 the process or system pulls data from the catalog at 104 for the current slide to rank the other slides in relative similarity to the input slide at 106 as a function of catalog similarity confidence values.

Otherwise, if determined at 104 that a catalog index/table of similarity confidence values is not built for the input slide relative, then at 108 et seq. the process builds a catalog index or table of similarity confidence values for the input slide relative to the other slides. Thus, at 108 the process or system crawls through (searches) directories (parent directories, subdirectories, etc.) of a slide repository structure (a "repository") to build a list of individual slides (presentation slide files) from POWERPOINT, OPENOFFICE or other slide presentation files. In some aspects of the invention the repository comprises a group of other slides that are stored or indexed in a structure defined by one or more local or networked storage devices accessible to the processor. However, other aspects may dynamically browse or search local, wide area network (WAN) and internet sources for slides via network communications in building the repository catalog table or index each time a catalog table or index is built.

At 110 text content and graphic element content of the input slide is compared to corresponding content of each of the repository slides found at 108, to generate raw scores that represent degrees or amounts of confidence of similarity of the compared slide content. In some aspects comparison of the graphic element content entails comparing entireties of an image representation of the entire visible slide content, such as arrangement of the multiple visible elements relative to each other that defines or otherwise conveys an overall graphic appearance. Graphic element content comparison may also focus on portions of the images or specific elements visible therein, such as logos, symbols, clip art and other distinct graphic elements. Thus, aspects of the present invention may compare the individual graphical elements (shapes, pictures, lines, etc.) of the slide, or the entire layout and overall look of the entire slide.

Images of the compared slides may be captured using the native Application Programming Interfaces (API's) of a software package in use, or visual data may be rendered in file forms subject to image analysis processing (for example, bit map files ".bmp" and other graphic file formats such as ".gif," ".pnp," ".pdf," and still others will be apparent to one skilled in the art).

In some aspects the compared slide text content comprises a plurality of different and distinct text content or attributes, generating a plurality of different text attribute comparison scores. FIG. 5 is a tabular illustration of an example of raw scores generated from the comparison at 110 of a given, input slide to five other slides as a function of graphic element criteria and a plurality of different text content or attributes that includes: (i) text contents of the slide titles; (ii) text contents of the body of the slides; and (iii) text contents of speaker notes. Higher scores in this example represent a higher degree of similarity, though this is not a limiting score basis. The "Slide ID" column in the table provides a unique name or identification for each of the compared slides. In the present example the five compared slides and their respective, associated raw similarity scores are identified as "Slide2" through "Slide6", wherein the input slide is "Slide1." Other naming criteria and schema may be practiced, for example as specified by vendor or user needs.

Referring again to FIG. 4, in the present example at 112 the raw similarity confidence scores are normalized to a standard scale. In one illustrative but not exhaustive example the scores are normalized to a standard scale ranging from 1 to 100, wherein 100 represents the highest score or best/perfect match, according to the following process [1]:

$$\text{Normalized value} = 1 + (x-W)*(100-1)/(P-W) \quad [1];$$

where "x" is the raw score, "P" is the highest or "perfect" raw score of all scores for that criteria/attribute across all of the compared slides, and "W" is the lowest or "worst" raw score of all scores for that criteria/attribute across all of the compared slides. FIG. 6 is a tabular illustration of the normalized values output according to process [1] of the raw scores of FIG. 5. Normalizing the raw scores enables mapping of the scores to a standard scale, to thereby support the use of a wide variety of text and image comparison processes in generating the raw scores, regardless of the range of output of the raw scores.

At 114 first weighted averages are determined for (generated from) the normalized graphic element content and text content confidence scores for each of the repository slides, as functions of (first) differential weightings of said normalized graphic element and text content confidence scores. More particularly different weights are assigned to the different normalized scores to reflect differences in their relative importance or usefulness in determining similarity to the input slide. The weightings are assigned to differentially take criteria into account in determining levels of confidence in the determined degrees of similarity to the input slide. As shown in the illustrative but not limiting or exhaustive example of FIG. 7, first weighted averages are generated as the averages of (in order or amount of weight/importance to the similarity result) 40% of the normalized body score, 30% of the normalized image score, 20% of the normalized title score and 10% of the normalized speaker notes score. The primary confidence scores are listed in a column entitled "% Confidence Primary." It will be apparent to one skilled in the art that different weighting percentages and relative amounts may be assigned as need: for example, the similarity of title may be most important and assigned a weighting of 45%, image score next in importance at 30%, etc.

However, even though the graphic content comparison scores may be given a relatively higher weighting relative to the text content comparison scores, the first weighted averages of the confidence scores may not satisfactorily represent levels of similarity between the slides where visual content of the slides are extremely similar, but textual contents of the slides are extremely dissimilar. Low text matching scores may bring down the primary confidence scores to too great an extent, wherein slides that have matching or highly similar graphic content will be scored (ranked) relatively low and thereby not considered relatively similar to the input slide to a satisfactory extent. Thus, where similarity rankings are used to identify similar slides for inclusion into a new slide presentation deck with the input slide, such slides may not be recognized.

In order to correct for this case, at 116 aspects of the present invention calculate (generate) additional (second) weighted averages of confidence scores that place a heavier emphasis on the image comparison score whenever the normalized graphic content similarity score is high enough to meet an image content match threshold value. The image content match threshold value is defined to correspond to a normalized graphic content similarity value that is large enough to indicate a match of compared attributes of the graphic content of the input slide to corresponding attributes of graphic content in the compared slides. The high image content confidence score may indicate a match (within a prescribed tolerance) in shape, scale and/or color of respective logos or other individual elements present in both slides, or of an arrangement of the multiple visible elements relative to each other that define or otherwise convey an overall graphic appearance of the compared slides.

Thus, for each of the slides that have a normalized graphic content similarity score that meets the image content match threshold, at 116 second weighted averages of the confidence scores are generated wherein higher weightings are assigned to the normalized graphic element confidence scores relative to the text content confidence scores, as compared to the weightings assigned in generating the first weighted averages at 114. This increases the effect of the normalized graphic element confidence scores over the text comparison scores in identifying similar slides, and may be set as needed to reflect differences in their relative importance or usefulness in determining similarity to the input slide. In some examples the second average weightings may result in scores that indicate similarities in compared slides in spite of little or no similarity of compared text content.

Referring again to the example of FIG. 6, the normalized graphic content similarity scores of "slide2" and "slide3" are "99%." As they both exceed an image content match threshold value of 90%, second weighted averages of their normalized confidence scores are generated as function of different weighting relative to those used for the first average and listed in FIG. 7 in the column entitled "% Confidence Secondary." In the present example the values listed are generated as a function of second average weightings (listed in relative order or amount of weight/importance to the similarity result) of 75% of the normalized image score, 15% of the normalized body score, 5% of the normalized title score and 5% of the normalized speaker notes score.

At 118 the largest values of the first and second weighted averages of the normalized confidence scores are selected as similarity confidence scores for each slide that are built or indexed into a catalog table for the input slide, for use in ranking, sorting or otherwise indicating their relative, respective similarity to the input slide at 106. Thus, as indicated in FIG. 7 the highest of the first weighted average values listed in the "% Confidence Primary" and second weighted average values listed in the "% Confidence Secondary" are selected as the catalog table/index values used for ranking at 106 and listed in the "% Confidence Final" column.

Some aspects of the present invention use the confidence score rankings generated at 106 to automatically recommend or chose slides for use with (or in substitution of) the input slide in a slideshow presentation. In some examples only those ranked slides having final confidence scores that are higher than a selection threshold are recommended or used. Thus, aspects of the present invention solve problems present in the prior art that are associated with inefficiencies in slide deck compilation. Rather than spend time and resources in creating new slide content for a new slide deck presentation, users of aspects of the present invention may quickly and automatically retrieve previously created slides that have graphic or text content similar to an input slide identified by the user (at 102, FIG. 4) and reuse pre-existing slide content indicated as appropriate as a function of objective indications of strength of similarity that are represented by the rankings generated (at 106, FIG. 4). Aspects of the present invention provide further advantages in identifying similar slides as a function of comparison based on an image of the slide, even where text within the body, title, or notes is not similar, or otherwise fails to meet text matching criteria under the prior art.

Figure 8:
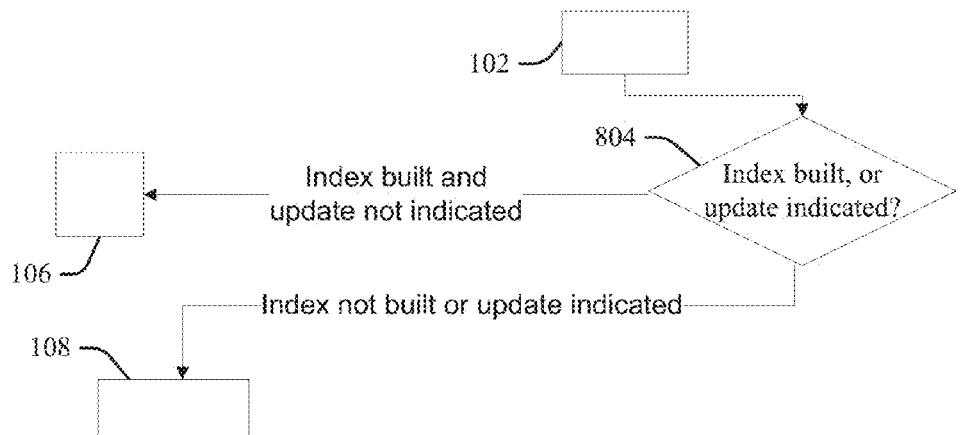
FIG. 8 is a flow chart illustration of a method or process according to another embodiment of the present invention for automated slide content comparison.

Aspects of the present invention may incorporate mechanisms to update catalog indexes or tables to ensure that rankings are generated (at 106, FIG. 4) from current data. For example, FIG. 8 illustrates an alternative embodiment wherein in response to the identification of the input slide for finding other similar slides at 102, the aspect determines at 804 whether an update to the catalog tables or indexes is indicated by the lapse of an update period since the catalog was built, or if a threshold number of requests for similarity rankings relative to the input slide has been made since a last build or update, indicating that the catalog may be stale. Still other update criteria may be applied at 804, and this present example is illustrative but not exhaustive. In some aspects the presumption is to update or rebuild the catalog unless it is very recent or fresh for example, is not more than a period of time old that indicates freshness (a day, a month, a year, etc.). The update may also be triggered at 804 in response to a user indication of a revision to or specification of a scope of directories or other parameter for searching.

Figure 9:
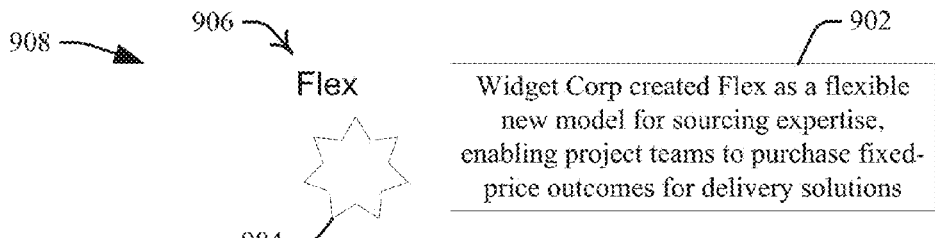
FIG. 9 is a graphic illustration of a slide for automated slide content comparison according to the present invention.
Figure 10:
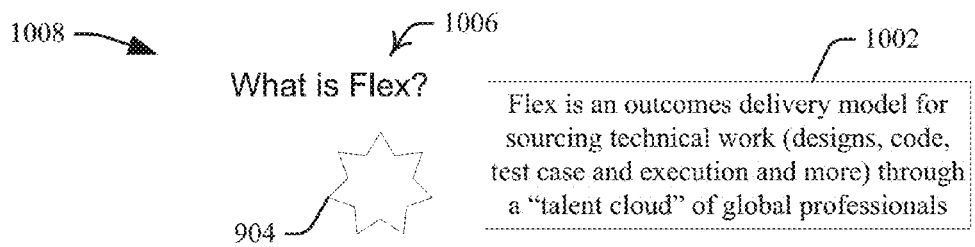
FIG. 10 is a graphic illustration of a slide for automated slide content comparison according to the present invention.
Figure 11:
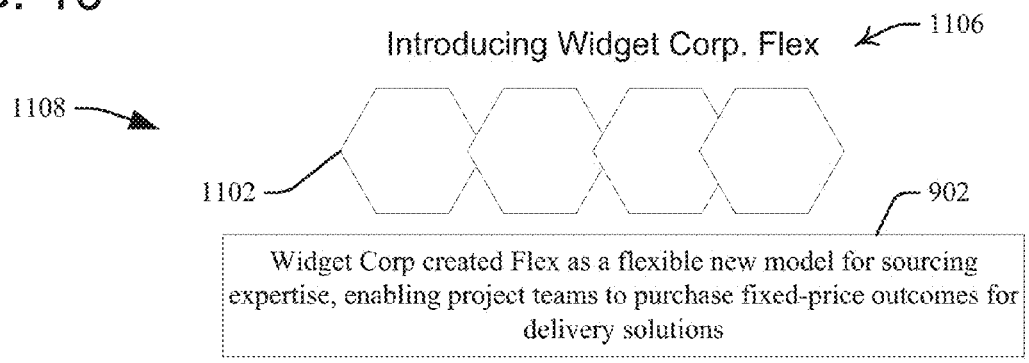
FIG. 11 is a graphic illustration of a slide for automated slide content comparison according to the present invention.

FIGS. 9, 10 and 11 illustrate an application of an aspect according to FIG. 4 or 8. FIG. 9 depicts an input slide (at 102, FIG. 4) that has a title text 906, text body content 902 and a graphic element (logo, symbol, etc.) 904. The arrangement of the elements 902, 904 and 906 relative to each defines or otherwise conveys an overall graphic appearance 908. FIGS. 10 and 11 each depict repository slides for which similarity confidence rankings values are generated (at 106, FIG. 4) relative to the input slide of FIG. 9.

Conventional prior art techniques that rely on text content analysis may determine that the slide of FIG. 11 is similar to the input slide of FIG. 9, as they share the same text body content 902 and have a text term in common ("Flex") in their respective title text content 906 and 1106. This may be in spite of significant differences in their respective graphic elements 904 and 1102, or the differences in overall graphic display arrangement 908 and 1108 created by the respective relative visual positioning of the elements 902, 904 and 906 relative to each other in the slide of FIG. 9, as compared to dissimilar overall visual arrangement 1108 of the elements 1102, 902 and 1106 relative to each other in the slide of FIG. 11. Further, such a prior art analysis may not find the slide of FIG. 10 to be similar to the slide of FIG. 9, due to significant differences in their respective text body contents 902 and 1002.

However, aspects of the present invention recognize that the slide of FIG. 10 is in fact similar to the input slide as a function of similar graphic elements. For example, in response to determining that they share the same graphic element 904, that the shared element 904 is depicted in a similar or common scale, and/or that the overall arrangement 908 and/or relative scales of the elements 902, 904 and 906 relative to each other in the slide of FIG. 9 is similar to or in common with the overall arrangement 1008 and/or relative scales of the elements 1002, 904 and 1006 relative to each other in the slide of FIG. 10. Thus, by more heavily weighting graphic attribute comparison scores, aspects may determine that the slide of FIG. 10 is in fact similar to the input slide of FIG. 9, even though they may have large differences between their respective text body contents 902 and 1002. This expands the use and availability and application of complementary, pre-existing slides for new presentment creation, relative to the prior art.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated slide content comparison, the method comprising executing on a computer processor the steps of:

in response to an identification of an input slide, generating text content confidence scores that represent amounts of similarity of slide text content of the input slide to compared text content of a plurality of slides that are included within slide presentation files of a repository;

generating graphic element content confidence scores that represent amounts of similarity of graphic content of the input slide to compared graphic element content of the respective ones of the plurality of slides;

generating similarity confidence scores for each of the respective ones of the plurality of slides as functions of weighted averages of the text content confidence scores and the graphic element content confidence scores generated for the respective ones of the plurality of slides, wherein the graphic element content confidence scores are weighted differently from the text content confidence scores; and ranking the plurality of slides for similarity to the input slide as a function of the generated similarity confidence scores.

2. The method of claim 1, wherein the step of generating the similarity confidence scores for each of the respective ones of the plurality of slides as the functions of the weighted averages of the text content confidence scores and the graphic element content confidence scores generated for the respective ones of the plurality of slides comprises:

generating first weighted averages of the graphic element content confidence scores and the text content confidence scores for each of the plurality of slides of the each slides as functions of a first differential weighting of the graphic element content confidence scores relative to the text content confidence scores;

comparing the graphic element content confidence scores of the plurality of slides to an image content confidence threshold value that indicates a strength of match of an attribute of the graphic content of the input slide to a corresponding attribute of the graphic content of the plurality of slides;

for each of the plurality of slides having a compared graphic element content confidence score that meets the image content confidence threshold value, generating second weighted averages of the graphic element content confidence scores and the text content confidence scores as functions of a second differential weighting of the graphic element content confidence scores relative to the text content confidence scores, wherein the second differential weighting increases a weighting of the graphic element content confidence score relative to the text content confidence score more than the first differential weighting; and selecting higher value ones of the first weighted averages and the second weighted averages as the similarity confidence scores for each of the respective ones of the plurality of slides.

3. The method of claim 2, wherein at least one of the steps of generating the text content confidence scores and generating the graphic element content confidence scores comprises:

generating raw confidence scores as a function of comparing slide content; and generating content confidence scores by normalizing the raw confidence scores as a function of lowest and highest generated raw score values.

4. The method of claim 2, wherein the graphic element content confidence scores are generated to represent at least one of:

amounts of similarity of an individual graphic element that is visible within the graphic content of the input slide to individual graphic elements that are visible within the graphic content of the respective ones of the plurality of slides, as a function of at least one of shape, scale, and color attributes; and amounts of similarity of an arrangement of multiple elements that are each visible within the graphic content of the input slide relative to each other to arrangements of multiple elements that are visible within the graphic content of respective ones of the plurality of slides, as a function of at least one of shape, scale, and color attributes.

5. The method of claim 2, further comprising:

in response to determining at least one of a lapse of an update period, and a threshold number of identifications of the input slide for comparison of slide text content and graphic element content to the respective ones of the plurality of slides has been met since the similarity confidence scores were most recently generated, repeating the steps of, in response to the identification of an input slide, comparing the slide text content of the input slide to the slide text content of the respective ones of the plurality of slides, comparing the graphic element content of the input slide to the graphic element content of the respective ones of the plurality of slides, generating the text content confidence scores, generating the graphic element content confidence scores, generating the similarity confidence scores, and ranking the plurality of slides for similarity to the input slide as a function of the generated similarity confidence scores.

6. The method of claim 1, further comprising:

integrating computer-readable program code into a computer system comprising the processor, a computer readable memory in circuit communication with the processor, and a computer readable storage medium in circuit communication with the processor; and wherein the processor executes program code instructions stored on the computer-readable storage medium via the computer readable memory and thereby performs the steps of generating the text content confidence scores that represent amounts of similarity of slide text content of the input slide to compared text content of the plurality of repository slides in response to the identification of an input slide, generating the graphic element content confidence scores that represent amounts of similarity of graphic content of the input slide to compared graphic element content of the respective ones of the plurality of slides, generating the similarity confidence scores for each of the respective ones of the plurality of slides as functions of weighted averages of the text content confidence scores and the graphic element content confidence scores generated for the respective ones of the plurality of slides, and ranking the plurality of slides for similarity to the input slide as the function of the generated similarity confidence scores.

7. The method of claim 6, further comprising:

providing the integrated computer-readable program code as a service in a cloud environment.

8. The method of claim 2, wherein the compared slide text content comprises a plurality of different text contents that comprise slide title text content and slide body text content;

wherein the step of generating the text content confidence scores comprises generating a slide title text content confidence score, and a slide body text content confidence score; and wherein the generated similarity confidence scores for each of the respective ones of the plurality of slides are functions of weighted averages of the slide title text content confidence scores and the slide body text content confidence scores, wherein the slide title text content confidence scores are weighted differently from the slide body text content confidence scores.

9. The method of claim 8, wherein the plurality of different text contents comprises slide speakers notes text content; and wherein the step of generating the text content confidence scores comprises generating a slide speakers notes text content confidence score; and wherein the generated similarity confidence scores for each of the respective ones of the plurality of slides are functions of weighted averages of the slide speakers notes text content confidence scores, wherein the slide speakers notes text content confidence scores are weighted differently from the slide title text content confidence scores and the slide body text content confidence scores.

10. The method of claim 9, wherein one of the first weighted averages and the second weighted averages is generated from a 40% weighting of the slide body text content confidence score, a 30% weighting of the graphic element content confidence score, a 20% weighting of the slide title text content confidence score, and a 10% weighting of the slide speaker notes text content confidence score.

11. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

in response to an identification of an input slide, generates text content confidence scores that represent amounts of similarity of slide text content of the input slide to compared text content of a plurality of slides that are included within slide presentation files of a repository;

generates graphic element content confidence scores that represent amounts of similarity of graphic content of the input slide to compared graphic element content of the respective ones of the plurality of slides;

generates similarity confidence scores for each of the respective ones of the plurality of slides as functions of weighted averages of the text content confidence scores and the graphic element content confidence scores generated for the respective ones of the plurality of slides, wherein the graphic element content confidence scores are weighted differently from the text content confidence scores; and ranks the plurality of slides for similarity to the input slide as a function of the generated similarity confidence scores.

12. The system of claim 11, wherein the processor executes the program instructions stored on the computer-readable storage medium via the computer readable memory and thereby generates the similarity confidence scores for each of the respective ones of the plurality of slides as the functions of the weighted averages of the text content confidence scores and the graphic element content confidence scores generated for the respective ones of the plurality of slides by:

generating first weighted averages of the graphic element content confidence scores and the text content confidence scores for each of the plurality of slides of the each slides as functions of a first differential weighting of the graphic element content confidence scores relative to the text content confidence scores;

comparing the graphic element content confidence scores of the plurality of slides to an image content confidence threshold value that indicates a strength of match of an attribute of the graphic content of the input slide to a corresponding attribute of the graphic content of the plurality of slides;

for each of the plurality of slides having a compared graphic element content confidence score that meets the image content confidence threshold value, generating second weighted averages of the graphic element content confidence scores and the text content confidence scores as functions of a second differential weighting of the graphic element content confidence scores relative to the text content confidence scores, wherein the second differential weighting increases a weighting of the graphic element content confidence score relative to the text content confidence score more than the first differential weighting; and selecting higher value ones of the first weighted averages and the second weighted averages as the similarity confidence scores for each of the respective ones of the plurality of slides.

13. The system of claim 12, wherein the processor executes the program instructions stored on the computer-readable storage medium via the computer readable memory and thereby generates at least one of the text content confidence scores and the graphic element content confidence scores by:

generating raw confidence scores as a function of comparing slide content; and generating content confidence scores by normalizing the raw confidence scores as a function of lowest and highest generated raw score values.

14. The system of claim 12, wherein processor generates the graphic element content confidence scores to represent at least one of:

amounts of similarity of an individual graphic element that is visible within the graphic content of the input slide to individual graphic elements that are visible within the graphic content of the respective ones of the plurality of slides, as a function of at least one of shape, scale, and color attributes; and amounts of similarity of an arrangement of multiple elements that are each visible within the graphic content of the input slide relative to each other to arrangements of multiple elements that are visible within the graphic content of respective ones of the plurality of slides, as a function of at least one of shape, scale, and color attributes.

15. The system of claim 12, wherein the compared slide text content comprises a plurality of different text contents that comprises slide title text content, slide body text content and slide speakers notes text content; and wherein the processor executes the program instructions stored on the computer-readable storage medium via the computer readable memory and thereby:

generates a slide title text content confidence score, a slide body text content confidence score and a slide speakers notes text content confidence score; and generates the similarity confidence scores for each of the respective ones of the plurality of slides as functions of weighted averages of the slide title text content confidence scores, the slide body text content confidence scores and the slide speakers notes text content confidence scores, wherein the slide speakers notes text content confidence scores are weighted differently from the slide title text content confidence scores and the slide body text content confidence scores.

16. A computer program product for automated slide content comparison, the computer program product comprising:

a computer readable storage medium having computer readable program code embodied therewith, wherein the computer readable storage medium is not a transitory signal per se, the computer readable program code comprising instructions for execution by a processor that cause the processor to:

in response to an identification of an input slide, generate text content confidence scores that represent amounts of similarity of slide text content of the input slide to compared text content of a plurality of slides that are included within slide presentation files of a repository;

generate graphic element content confidence scores that represent amounts of similarity of graphic content of the input slide to compared graphic element content of the respective ones of the plurality of slides;

generate similarity confidence scores for each of the respective ones of the plurality of slides as functions of weighted averages of the text content confidence scores and the graphic element content confidence scores generated for the respective ones of the plurality of slides, wherein the graphic element content confidence scores are weighted differently from the text content confidence scores; and rank the plurality of slides for similarity to the input slide as a function of the generated similarity confidence scores.

17. The computer program product of claim 16, wherein the computer readable program code instructions for execution by the processor further cause the processor to generate the similarity confidence scores for each of the respective ones of the plurality of slides as the functions of the weighted averages of the text content confidence scores and the graphic element content confidence scores generated for the respective ones of the plurality of slides by:

generating first weighted averages of the graphic element content confidence scores and the text content confidence scores for each of the plurality of slides of the each slides as functions of a first differential weighting of the graphic element content confidence scores relative to the text content confidence scores;

comparing the graphic element content confidence scores of the plurality of slides to an image content confidence threshold value that indicates a strength of match of an attribute of the graphic content of the input slide to a corresponding attribute of the graphic content of the plurality of slides;

for each of the plurality of slides having a compared graphic element content confidence score that meets the image content confidence threshold value, generating second weighted averages of the graphic element content confidence scores and the text content confidence scores as functions of a second differential weighting of the graphic element content confidence scores relative to the text content confidence scores, wherein the second differential weighting increases a weighting of the graphic element content confidence score relative to the text content confidence score more than the first differential weighting; and selecting higher value ones of the first weighted averages and the second weighted averages as the similarity confidence scores for each of the respective ones of the plurality of slides.

18. The computer program product of claim 17, wherein the computer readable program code instructions for execution by the processor further cause the processor to generate at least one of the text content confidence scores and the graphic element content confidence scores by:

generating raw confidence scores as a function of comparing slide content; and generating content confidence scores by normalizing the raw confidence scores as a function of lowest and highest generated raw score values.

19. The computer program product of claim 17, wherein the computer readable program code instructions for execution by the processor further cause the processor to generate the graphic element content confidence scores to represent at least one of:

amounts of similarity of an individual graphic element that is visible within the graphic content of the input slide to individual graphic elements that are visible within the graphic content of the respective ones of the plurality of slides, as a function of at least one of shape, scale, and color attributes; and amounts of similarity of an arrangement of multiple elements that are each visible within the graphic content of the input slide relative to each other to arrangements of multiple elements that are visible within the graphic content of respective ones of the plurality of slides, as a function of at least one of shape, scale, and color attributes.

20. The computer program product of claim 17, wherein the compared slide text content comprises a plurality of different text contents that comprises slide title text content, slide body text content and slide speakers notes text content; and wherein the computer readable program code instructions for execution by the processor further cause the processor to:

generate a slide title text content confidence score, a slide body text content confidence score and a slide speakers notes text content confidence score; and generate the similarity confidence scores for each of the respective ones of the plurality of slides as functions of weighted averages of the slide title text content confidence scores, the slide body text content confidence scores and the slide speakers notes text content confidence scores, wherein the slide speakers notes text content confidence scores are weighted differently from the slide title text content confidence scores and the slide body text content confidence scores.

* * * * *